(12) United States Patent
Ho

(10) Patent No.: US 10,094,676 B1
(45) Date of Patent: Oct. 9, 2018

(54) SYSTEM AND METHOD FOR CALCULATING AND STORING PREDICTED TRAVEL TIMES

(71) Applicant: Waye, LLC, Woodinville, WA (US)

(72) Inventor: William P. C. Ho, Woodinville, WA (US)

(73) Assignee: Waye, LLC, Woodinville, WA (US)

( * ) Notice: Subject to any disclaimer, the term of this patent is extended or adjusted under 35 U.S.C. 154(b) by 0 days.

(21) Appl. No.: 15/474,757

(22) Filed: Mar. 30, 2017

Related U.S. Application Data

(60) Provisional application No. 62/321,621, filed on Apr. 12, 2016.

(51) Int. Cl.
*G01C 21/00* (2006.01)
*G01C 21/34* (2006.01)
*G06F 17/30* (2006.01)
*G06N 5/04* (2006.01)
*G01C 21/36* (2006.01)

(52) U.S. Cl.
CPC ....... *G01C 21/343* (2013.01); *G01C 21/3605* (2013.01); *G06F 17/30241* (2013.01); *G06N 5/04* (2013.01)

(58) Field of Classification Search
None
See application file for complete search history.

(56) References Cited

U.S. PATENT DOCUMENTS 8,438,118 B2    5/2013  Ho et al.
8,554,467 B2   10/2013  Ho et al.
2017/0031926 A1*  2/2017 Katircioglu ............ G01C 21/32

* cited by examiner

*Primary Examiner* — James M McPherson
(74) *Attorney, Agent, or Firm* — Perkins Coie LLP

(57) ABSTRACT

A system for representing predicted travel times between pick-up and drop-off addresses for which routes are to be scheduled. In some embodiments, a computer system defines a disk representing a geographic area surrounding each address having a radius that is selected such that a travel time between any two locations in the area of the disk is within a predetermined time limit. If the travel time from an address to a man-made or natural obstacle that limits travel in the area of the disk is within the predetermined time limit then the radius of the disk is reduced to the distance to the obstacle. A memory stores predicted travel times between addresses encompassed by the geographic areas of different disks.

6 Claims, 10 Drawing Sheets

Steps 1 & 2 – Calculate "covered count" & mark "available".

| Candidate-disk | Covered-count | Available |
|---|---|---|
| D1 | 2 | 1 |
| D2 | 4 | 1 |
| D3 | 3 | 1 |
| D4 | 4 | 1 |
| D5 | 3 | 1 |
| D6 | 2 | 1 |

Covering-set = { }

Steps 3 & 4 – Select candidate disk with highest "covered count", mark it "unavailable", and add to "covering set".

| Candidate-disk | Covered-count | Available |
|---|---|---|
| D1 | 2 | 1 |
| ~~D2~~ | ~~0~~ | ~~0 select~~ |
| D3 | 3 | 1 |
| D4 | 4 | 1 |
| D5 | 3 | 1 |
| D6 | 2 | 1 |

Covering-set = { D2 }

Step 5 – Decrement "covered count" of candidate disks that cover the seed address of the selected candidate disk. Since this address is covered by the "covering set", it no longer needs to be considered.

Seed address of selected disk (changed from ● to ▓ in figure).

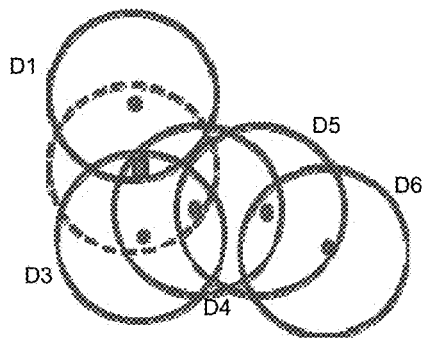

| Candidate-disk | Covered-count | Available |
|---|---|---|
| D1 | 2 → 1 | 1 |
| ~~D2~~ | ~~0~~ | ~~0 select~~ |
| D3 | 3 → 2 | 1 |
| D4 | 4 → 3 | 1 |
| D5 | 3 | 1 |
| D6 | 2 | 1 |

Covering-set = { D2 }

*FIG. 13C*

Step 6 – Decrement "covered count" of candidate disks that cover the other addresses of the selected candidate disk. Since these addresses are covered by the "covering set", they no longer need to be considered.

Other addresses covered by selected candidate disk (changed from ● to ▓ in figure).

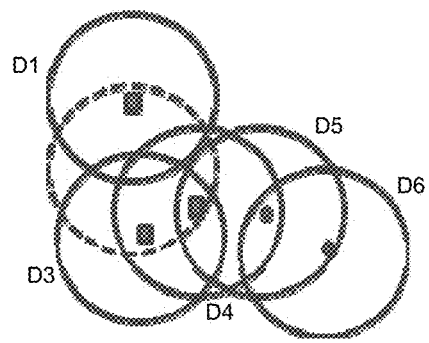

| Candidate-disk | Covered-count | Available |
|---|---|---|
| D1 | 1 → 0 | 1 |
| ~~D2~~ | ~~0~~ | ~~0 select~~ |
| D3 | 2 → 0 | 1 |
| D4 | 3 → 1 | 1 |
| D5 | 3 → 2 | 1 |
| D6 | 2 | 1 |

Covering-set = { D2 }

*FIG. 13D*

Step 7 – Mark candidate disks whose "covered count" = 0 as unavailable.

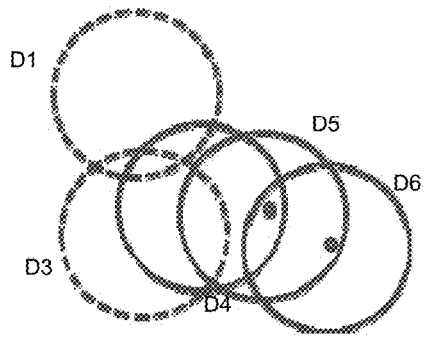

| Candidate-disk | Covered-count | Available |
|---|---|---|
| ~~D1~~ | ~~0~~ | ~~1 → 0~~ |
| ~~D2~~ | ~~0~~ | ~~0~~ |
| ~~D3~~ | ~~0~~ | ~~1 → 0~~ |
| D4 | 1 | 1 |
| D5 | 2 | 1 |
| D6 | 2 | 1 |

Covering-set = { D2 }

*FIG. 13E*

Step 8 – Go to Step 3 & 4, to do the next selection cycle. Steps 5 & 6 have updated the "covered count" to include only addresses that are not yet covered.

Steps 3 & 4 – Select candidate disk with highest "covered count", mark it "unavailable", and add to "covering set".

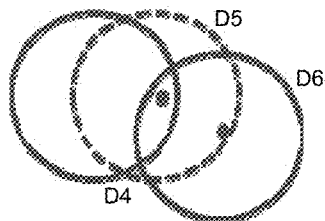

| Candidate-disk | Covered-count | Available |
|---|---|---|
| ~~D1~~ | ~~0~~ | ~~0~~ |
| ~~D2~~ | ~~0~~ | ~~0~~ |
| ~~D3~~ | ~~0~~ | ~~0~~ |
| D4 | 1 | 1 |
| ~~D5~~ | ~~0~~ | ~~0 select~~ |
| D6 | 2 | 1 |

Covering-set = { D2, D5 }

*FIG. 13F*

Step 5 – Decrement "covered count" of candidate disks that cover the seed address of the selected candidate disk. Since this address is covered by the "covering set", it no longer needs to be considered.

Seed address of selected disk (changed from ● to ▓ in figure).

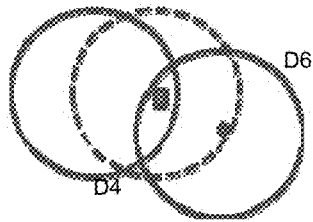

| Candidate-disk | Covered-count | Available |
|---|---|---|
| ~~D1~~ | ~~0~~ | ~~0~~ |
| ~~D2~~ | ~~0~~ | ~~0~~ |
| ~~D3~~ | ~~0~~ | ~~0~~ |
| D4 | 1 → 0 | 1 |
| ~~D5~~ | ~~0~~ | ~~0~~ |
| D6 | 2 → 1 | 1 |

Covering-set = { D2, D5 }

*FIG. 13G*

Step 6 – Decrement "covered count" of candidate disks that cover the other addresses of the selected candidate disk. Since these addresses are covered by the "covering set", they no longer need to be considered.

Other addresses covered by selected candidate disk (changed from ● to ▓ in figure).

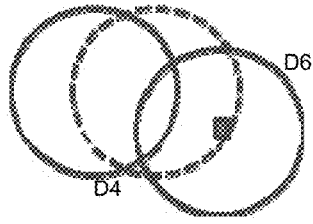

| Candidate-disk | Covered-count | Available |
|---|---|---|
| ~~D1~~ | ~~0~~ | ~~0~~ |
| ~~D2~~ | ~~0~~ | ~~0~~ |
| ~~D3~~ | ~~0~~ | ~~0~~ |
| D4 | 0 | 1 |
| ~~D5~~ | ~~0~~ | ~~0~~ |
| D6 | 1 → 0 | 1 |

Covering-set = { D2, D5 }

*FIG. 13H*

Step 7 – Mark candidate disks whose "covered count" = 0 as unavailable.

| Candidate-disk | Covered-count | Available |
|---|---|---|
| ~~D1~~ | 0 | 0 |
| ~~D2~~ | 0 | 0 |
| ~~D3~~ | 0 | 0 |
| ~~D4~~ | 0 | 1 → 0 |
| ~~D5~~ | 0 | 0 |
| ~~D6~~ | 0 | 0 → 0 |

Covering-set = { }

Browser-based Scheduling as a Service with Travel prediction as a Service

SYSTEM AND METHOD FOR CALCULATING AND STORING PREDICTED TRAVEL TIMES

CROSS-REFERENCE TO RELATED APPLICATION(S)

The present application claims the benefit of U.S. Provisional Patent Application No. 62/321,621 filed Apr. 12, 2016, which is herein incorporated by reference in its entirety.

TECHNICAL FIELD

The disclosed technology relates to travel time prediction systems.

BACKGROUND

In the paratransit demand-response model, a trip scheduling system has to organize rides between pick-up and drop-off locations that are requested from riders. For example, it is not uncommon that a scheduling system has to divide up to 25,000 daily trip requests among 2,500 or fewer routes (driver shift and vehicle) subject to a multitude of constraints. These constraints include: making pick-ups and drop-offs within each trip's requested 30-minute pickup window and/or appointment window, not exceeding a maximum onboard ride time for each passenger (Maximum Ride Time), not exceeding a vehicle's ambulatory and wheelchair seating capacities, meeting wheelchair LIFO loading and unloading, meeting driver shift start and end times, using different speeds by time period of day, using different speeds in different geographic speed regions or zones, and so on.

Scheduling the routes requires the system be able to calculate an expected travel time between any candidate pair of addresses in the trip request set in order to determine if they can correctly and efficiently be made adjacent stops on a route in a schedule. Travel speeds vary by time period of day (e.g. rush hours or typical congestion, school zones etc.) as well as geographically by law, such as the maximum speed permitted in a geographic region (e.g. speed regions or speed zones), which add more variables to travel time calculations. Empirically, for 25,000 trips, the number of calls to a computer system for travel time estimations between candidate address pairs by time of day can exceed 200,000,000. The travel time prediction calculations are therefore the overwhelming majority of a scheduling system's processing workload.

The speed of the scheduling system is important since the scheduling system is presented with a different trip request set to schedule each day of the year. The time when clients can make trip requests typically ends at 17:00 the evening before. The scheduling system must generally finish scheduling the trip request set by 18:00 or so in order to allow time for the operational staff to make any necessary adjustments and have an IVR (Interactive Voice Response) system call out the pick-up times to all clients by 21:00. Therefore, there is a premium on making the travel time calculations faster.

The accuracy of travel time predictions is also important. Since the actual travel times on the day of service are guaranteed to vary with traffic, weather, and other real-world variables, significant inaccuracies in predicted travel times have a domino effect. A significant error in a predicted travel time that causes a late arrival at a stop propagates the delay forward in time, potentially causing multiple downstream stops to fall outside their committed time windows. This creates messy "pile ups" for dispatchers to untangle on the day of service. This also decreases On-time Performance (OTP), which can have costly financial penalties that may be dictated by negotiated contracts with city or regional governments. Delays can also lead to customer complaints because of late pick-ups, late drop-offs at appointments, and excessive on-board ride times.

Given two addresses and a time period of the day at which a trip is requested, there are various methods for determining the travel time between the addresses. One is to define speed regions as polygons partitioning a service region, each with an associated table of speeds by time period of day. One speed region might correspond to a city center, with a 6 miles per hour average speed in the morning rush hour between 6:30 and 10:30, 5.5 miles per hour average speed in the evening rush hour between 16:00 and 18:30, and 10 miles per hour average in the off rush hour periods. The distance between two addresses (X1,Y1; X2,Y2) can be calculated by triangulation ($|X2-X1|+|Y2-Y1|$) or by Pythagorean Theorem ($SQRT(|X2-X1|^2+|Y2-Y1|^2)$). There are adjustments designed to handle addresses being in different speed regions, crossing rivers on bridges, going around barriers, and so on.

Another approach is to use a GIS representation of a street network, with a speed by time of day associated with each street segment. The distance and travel time between two addresses is calculated by applying a route algorithm such as Dijkstra's algorithm or the A* algorithm, which produces a turn-by-turn route that takes the shortest travel time between the addresses. At each point during the calculation, the travel time to reach that node location (corresponding to a street intersection) from the origin address is known.

U.S. Pat. Nos. 8,036,822 & 8,554,467 describe a static, fixed grid representation overlaying a service area as shown in FIG. 1. The service area is divided into a number of grid sections. Each individual grid section 50 is sized such that the time required to travel from any point to any other point within the individual grid section takes at most an arbitrary constant time, assuming that no obstacles (e.g. rivers, lakes, campuses, parks etc.) are located within the area of the grid section. An obstacle, such as a river, that requires crossing at a bridge in a different grid section that is miles away can introduce a significant inaccuracy in a travel time prediction (with domino effect). This defeats the reliability of this representation for travel time prediction.

As shown in FIG. 2, a river 52 runs through a number of grid sections that reduces the likelihood that a person can travel to any position within the section in the time period that defines the size of the section if the river has to be crossed. One suggested method to minimize the impact of obstacles in a grid section is to divide the section into 4 sub-grid sections 54a-54d as shown in FIG. 2. If the obstacle still appears within a sub-grid section(s), the problem affecting the accuracy of travel time prediction is unsolved, and the sub-grid section(s) with the obstacle are subject to again being sub-divided into 4 smaller grid sections. Even if solved, this approach significantly increases the number of grid sections that need to be considered, which complicates and slows down the travel time predictions.

A similar issue occurs at boundaries between different speed regions as shown in FIG. 3. Here three speed regions 60, 62 and 64 intersect within a grid section such that one grid section 66a encompasses areas with three different maximum rates of travel. If the grid size is calculated such that the travel time between any two points within the grid section takes at most an arbitrary constant time for the faster speed region side of the boundary, the travel time will not be met for points on the slower speed region side(s) of the grid section.

In a similar manner to that used to solve the problem with rivers or other man-made obstacles, one suggested method of minimizing the impact of speed region boundaries is to iteratively divide a grid section into 4 sub-grid sections, until all sub-grid sections meet the requirement for the slowest speed region that appears in that sub-grid section. This significantly increases the number of grid sections that need to be considered, which complicates and slows down travel time prediction calculations.

In a conventional system, the grid boundaries are statically defined once an origin of a Cartesian coordinate system covering the geographic region of interest is defined. A look up table, such as shown in FIG. 4, is defined that stores predicted travel times between grid sections. Because travel times are often not symmetric between addresses, an N×N table is generally used for a geographic area represented by N grid sections.

As will be appreciated, different grids may be defined for different times of day (e.g. smaller grid sections during rush hour) or for different days (weekdays, weekends, holidays etc.) Once the grids sections are defined, the coordinates of the requested pick-up and drop-off locations are mapped onto the grid. Any grid section with a requested pick-up or drop-off location is said to be occupied.

The predicted grid-to-grid section travel times are calculated among occupied grid sections and stored in a travel time look up table (occupied grid section by occupied grid section by time period of day). Any request by the scheduling system for a predicted travel time between a candidate pair of addresses in a trip request set by time period of day can be satisfied by the data in the look up table instead of performing a separate calculation and be limited to at most a 1 minute difference from a calculated result (assuming that each grid section is defined by a travel distance of 30 seconds). Since the actual travel time on the day of service is guaranteed to vary with traffic, weather, and other real-world variables, 1 minute accuracy is more than adequate for planning before the day of service.

Looking up the stored travel times between the grid sections for a particular time of day, is much faster than calculating a predicted travel time between two addresses. Address-to-address calculations are replaced by one grid-to-grid section calculation with a lookup table. If grid section A has 5 addresses, and grid section B has 5 addresses in the morning rush hour, a scheduling system using address-to-address calculations will make 25 requests for travel time predictions. In the grid to grid method, the scheduling system identifies the grid sections for the two addresses, makes 1 request to a travel time prediction routine to populate the travel time table, and thereafter looks up the travel times in the resulting table 24 times. The scheduling system processes much faster with an arbitrarily controlled accuracy of travel times (e.g. within 1 minute).

While the use of a travel time table using grid sections is a significant improvement over calculating the travel times between individual addresses, the system is adversely affected by the problems associated with the issue of obstacles crossing within grid sections and different speed zones in a grid section, which cause inaccurate travel time predictions.

SUMMARY

To address one or more of the above problems, the technology disclosed herein relates to a system and method for representing a number of predicted travel times between addresses in a geographic area in a manner that can be used by a scheduling system to schedule routes. In one disclosed embodiment, the system represents addresses as a disk or circular shape that encompasses a geographic area. In one embodiment, the method dynamically generates and locates disks representing pick-up or drop-off addresses over an area and selects a minimal set of disks to contain all the addresses in a trip request set. Each disk is dynamically sized to have radius such that a travel time from any point to any other point within the area of the disk is predicted to take at most some arbitrary constant time (e.g. ½ minute). By establishing a travel time table representing travels times from disk-to-disk, the travel time predictions required by a scheduling system is made accurate to a controllable granularity, are more efficient in memory and more efficient in processing time. Instead of calculating address X to address Y travel times on a GIS network representation, the scheduling system identifies address X's containing disk and address Y's containing disk, and uses the travel time lookup table to determine a predicted the travel time between disks with an arbitrary accuracy (e.g. to within 1 minute).

BRIEF DESCRIPTION OF THE DRAWINGS

FIGS. 13a-13i illustrate how a cover set of disks is selected to include a number of unique addresses in a geographic area in accordance with an embodiment of the disclosed technology.

DETAILED DESCRIPTION

Figure 5:
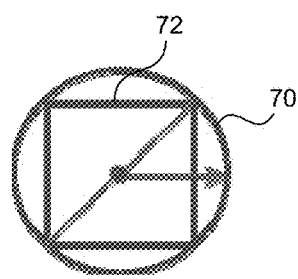
FIG. 5 shows a relationship between the area covered by a grid section and a corresponding disk that is used to represent predicted travel times in accordance with an embodiment of the disclosed technology.

As will be discussed in further detail below, the disclosed technology operates to dynamically define and place shapes over a geographic area that encompass pick-up or drop-off locations to be scheduled in a route. In the embodiment disclosed, the shapes represent a geographic distance that can be travelled within a set time interval from a pick-up or drop-off location. In one embodiment the shapes are disks or circles because they encompass the maximum geographic area for a given radius, FIG. 5 shows a representative disk 70 and how it encompasses 57% more area than the largest square grid section 72 that can fit in the disk. Although circular disks are the preferred shape, it will be appreciated that other shapes (pentagons, hexagons, squares, ellipses, etc.) could be used to implement the disclosed technology if desired.

The geographic area encompassed by the shape is selected such that the time required to travel between any location encompassed by the shape is no more than some defined maximum time (e.g. no more than 30 seconds). As will be discussed below, the boundaries of the shape take into consideration speed zones or natural and man-made obstacles that affect travel times with the shape.

For the remainder of disclosure, the shapes are referred to as disks and the maximum travel time between any two address that are encompassed by the area of a single disk is assumed to be 30 seconds. Disks are defined using a seed point having the address of a pick-up or drop-off location at their centers. In one embodiment, disks are dynamically located and dynamically sized given a set of pick-up or drop-off locations to be scheduled. The number of disks defined is then minimized to reduce the number of disks required to encompass all the pick-up and drop-off locations to be scheduled thereby using significantly less memory for significantly faster processing. The size and placement of the disks explicitly disallow any obstacle from crossing within a disk for more accurate travel time predictions. In one embodiment, the boundaries of a disk (e.g. its radius) are determined using a GIS program and a route prediction algorithm such as the Dijkstra algorithm or the A* algorithm to calculate how far can be travelled within the time period that is set for the disk. As will be appreciated, size of the disks can depend the time of day, the day of the week, seasonal changes, speed zones, construction delays or any other parameter that is considered by the travel time prediction algorithms to estimate predicted travel times.

Figure 7:
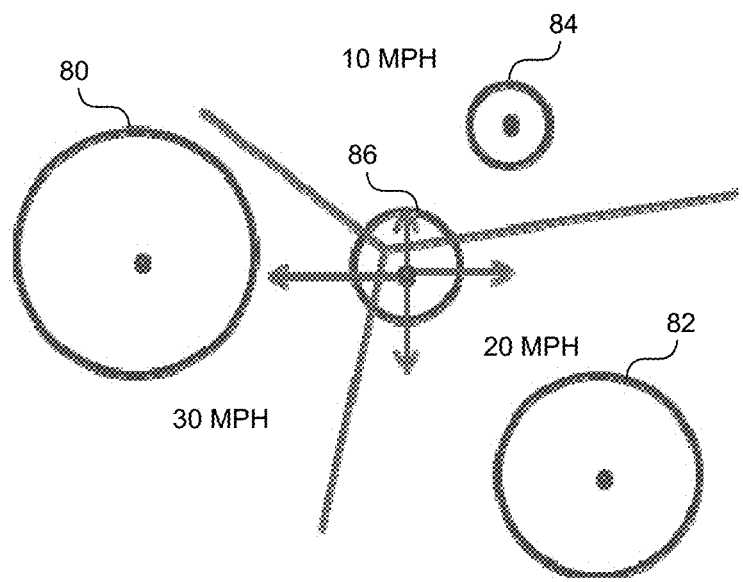
FIG. 7 illustrates how a radius of a disk can be sized to accommodate different speed zones in a geographic area in accordance with an embodiment of the disclosed technology.

FIG. 7 illustrates a number of disks 80, 82 and 84 that are located in different speed zones. Each disk is generated from a unique address as a seed vertex. In all cases, a computer calculates the distance reached from the vertex in 15 seconds in all directions on the GIS street network. The radius of the dynamically generated disk is the shortest distance reached in any direction in the time limit from the vertex. As will be appreciated, the size of a disk that is located in a faster speed zone (e.g. a disk 80 in a 30 mph speed zone) will have a radius that is larger than the radius of a disk that is located in an area with a slower speed zone (e.g. a disk 84 in a 10 mph speed zone). Disks, such as disk 86, that encompass multiple speed zones have a radius determined by the minimum distance that can be travelled from the seed point vertex in any direction within the time period set for the disk taking into account the various changes in speed zones.

Figure 8:
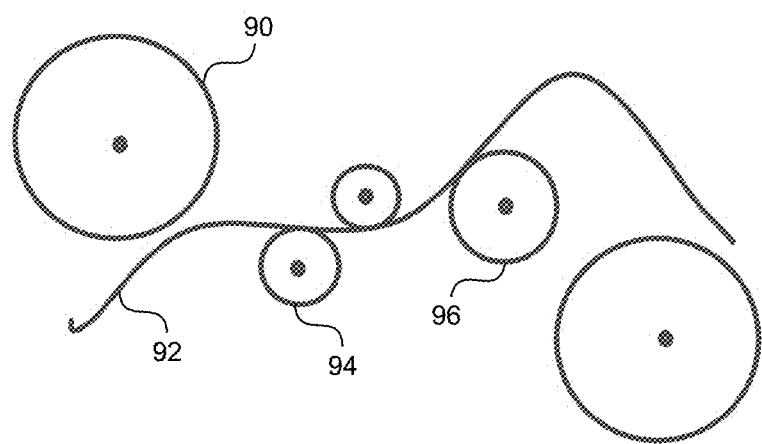
FIG. 8 illustrates how the radius of a disk can be sized to accommodate the presence of a natural or man-made barrier in accordance with an embodiment of the disclosed technology.

FIG. 8 illustrates how disks are sized when a seed location is near a natural or man-make obstacle in accordance with an embodiment of the disclosed technology. In this situation, the radius of the disk takes into consideration the obstacle's effect on travel times through the disks. For example, a disk 90 that is farther away from a river 92 may have a larger radius than a disk 94 that is close the river. A disk 96 may have a larger radius than the radius of the disk 94 even though they are equally close to the river 92 if the seed location of the disk 96 is near a bridge or tunnel that doesn't slow down traffic.

Figure 6:
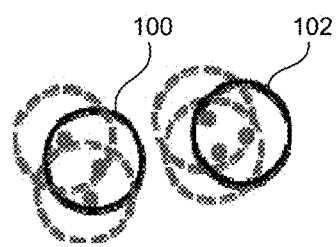
FIG. 6 illustrates how a minimum set of disks can be chosen to cover a set of unique pick-up or drop-off addresses in accordance with an embodiment of the disclosed technology.

In some embodiments, once disks have been defined for each of the pick-up and drop-off locations at the particular time for the ride schedule to be produced, the number of disks is reduced to define a lessor number of disks that still encompass each of the requested pick-up and drop-off locations. FIG. 6 illustrates how six disks that are defined for six seed locations can be reduced to two disks 100 and 102 that cover each of the six pick-up and drop-off locations. In one embodiment, the set of disks is reduced to the minimum number of disks required to cover each of the pick-up and drop-off locations. However, it will be appreciated that more than a minimum number of disks could be used, although this is less efficient in terms of the memory required to represent the disks and the time to compute predicted travel times between addresses.

Figure 10:
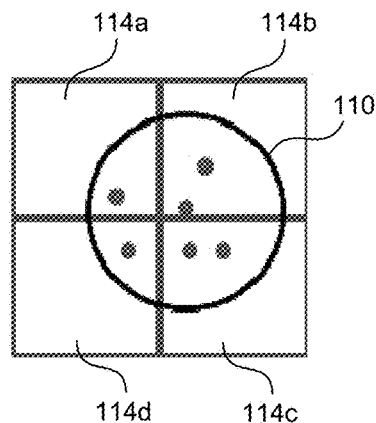
FIG. 10 illustrates how a single, dynamically located disk can take the place of several statically located grid sections.
Figure 11:
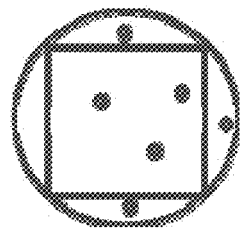
FIG. 11 illustrates how additional pick-up or drop-off address locations can be included in a single disk rather than having to define additional grid sections in a geographic region.

FIG. 10 illustrates an increased efficiency when using a disk to encompass a group of pick-up and/or drop-off locations rather than by using grid sections with fixed locations. In the illustration, it can be seen that a single disk 110 can encompass six pick-up and/or drop-off locations, whereas if the locations were placed on a fixed grid then four grid sections 114a-114d would be needed in a look up table that stores predicted travel times between grid sections. In addition, due to the increased area encompassed by a disk rather than a square grid section, additional points can be added to a disk rather than requiring new grid squares as shown in FIG. 11.

Figure 12:
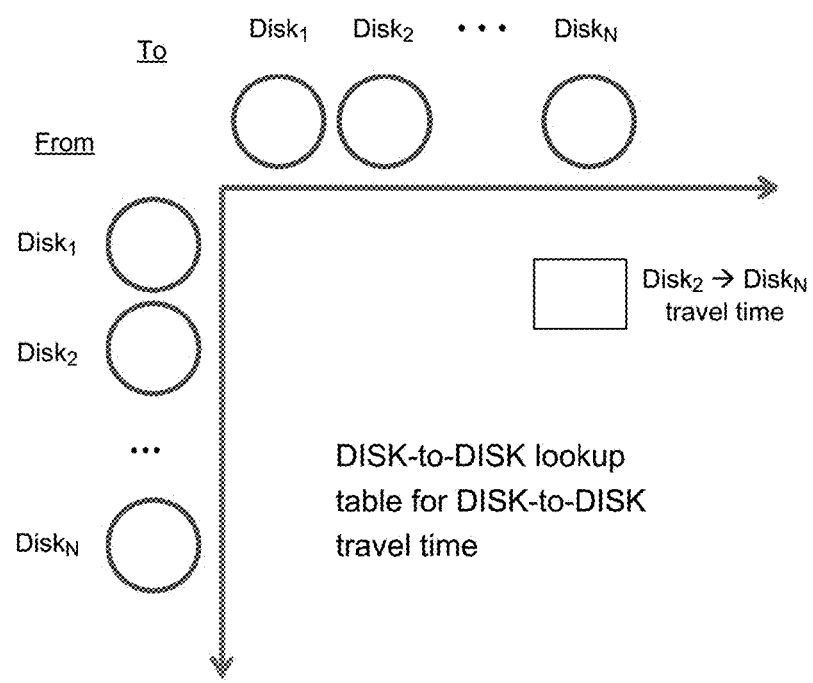
FIG. 12 illustrates a disk-based lookup table for storing predicted travel times between addresses associated with the disks in accordance with an embodiment of the disclosed technology.

Once a set of disks are defined for the pick-up and drop-off locations in a geographic region and for the time of the schedule to be created, a look up table for the disks is defined as shown in FIG. 12. In some embodiments, the look up table is N×N for N disks because the time required to travel from addresses in disk i to addresses in disk j is generally not the same as the time required to travel from addresses in disk j to addresses in disk i. Each cell in the look up table stores the time predicted for travel between the addresses encompassed by two disks.

As discussed above, the speed of the travel time predictions is important. Travel time prediction calculations are the overwhelming majority of the scheduling system's processing workload. The smaller the memory required to represent the information for the travel time predictions, the faster the travel time predictions.

As will be explained below, a set of addresses covers a geographic area. The set could be dynamically received on a periodic basis such as from clients who have called in the past 24 hours for a ride. Alternatively, the system could contain all previously known addresses for which rides have been scheduled within the past 6 months or the past year.

In one embodiment, each address is associated with a disk with a radius that is dynamically set to a distance such that any point in the disk can be reached in a defined amount of time (e.g. 30 seconds, 1 minute etc.) In one embodiment, each address is a "seed" address that defines the center point of a disk. A GIS program using well known algorithms is used to determine how far one can travel from the seed point at the defined speed limits in any direction on the roads radiating from the seed address. For example, the program can take the seed point address as a starting point and determine how far can be reached in 15 seconds from the center of the disk. The radius of the disk is then then set to the minimum distance that can be travelled in any direction. As will be appreciated, seed points that are located in higher speed zones will generally be associated with disks that have larger diameters. In one embodiment, if a man-made or natural obstacle (e.g. a river, bridge, railroad tracks, park, school zone etc.) limits the distance that can be traveled in any direction from the seed point in the time period allowed, then the radius of the disk is automatically limited to the distance to the obstacle. Obstacles are thereby precluded from ever crossing within a disk.

At boundaries among speed regions, the issue of differing speed zones is solved. A GIS program using well-known algorithms is used to determine how far one can travel from the seed point at the defined speed limits in any direction on the roads radiating from the seed point. The distance traveled into the slowest speed zone is the shortest and automatically reduces the radius of the disk.

Figure 9:
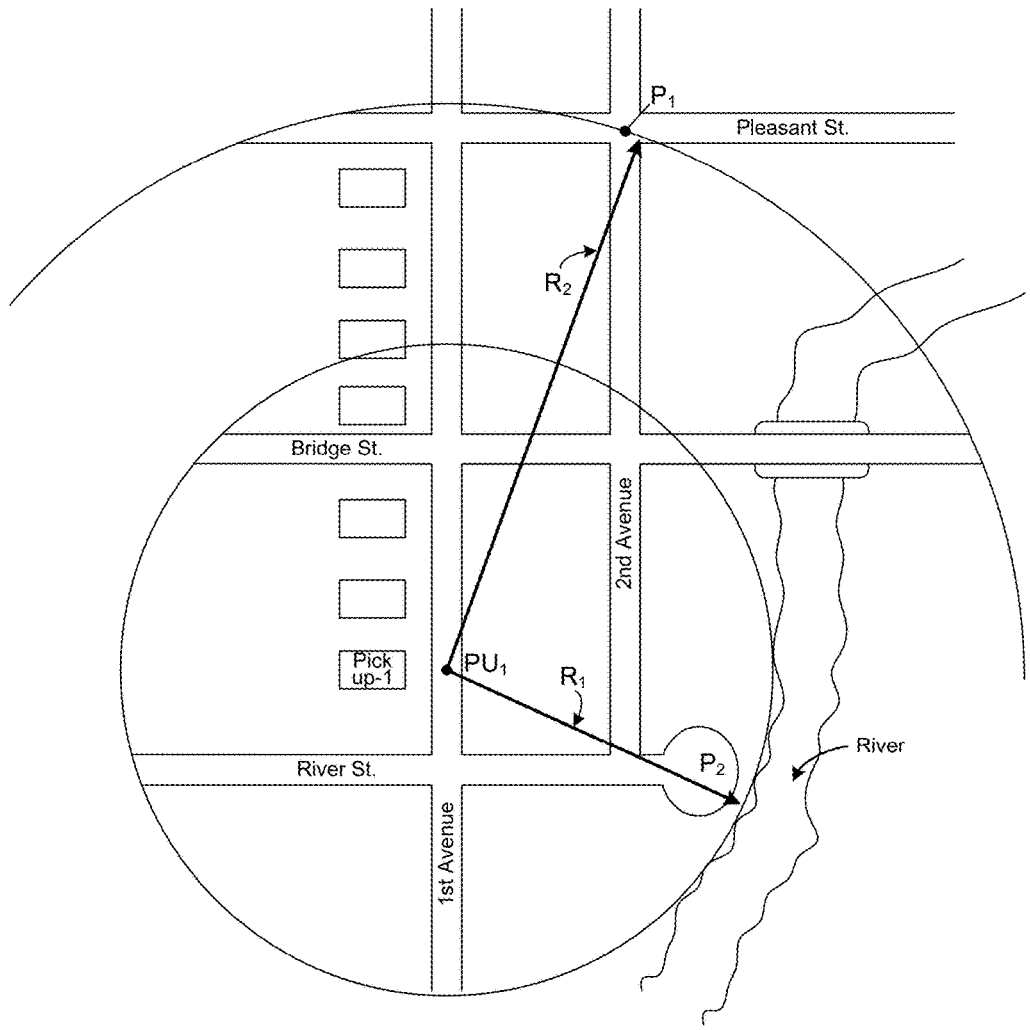
FIG. 9 shows a simplified map and how a radius of a disk may be defined in accordance with an embodiment of the disclosed technology.

FIG. 9 illustrates steps performed by a computer system to determine the location and size of a disk that encompasses a pick-up or drop-off location in accordance with some embodiments of the disclosed technology. As indicated above, a computer system receives a list of pick-up and drop-off locations at which riders would like to schedule a ride. A pick-up location PU1 is located in a neighborhood of houses near a natural obstacle labelled RIVER. A travel prediction time computer uses a GIS program with a database of the streets surrounding the pick-up location and the speeds at which the streets can be travelled, which may vary by time of day, day of the week, season etc. The travel time prediction computer uses the GIS program to determine how far away a vehicle could travel in any direction on the roads from the pick-up location within a predetermined time limit for the disk. In the example shown, a vehicle may travel on a first route that leaves the pick-up location and travels north on 1st avenue and then turns right on Pleasant street at a rate of speed specified by the GIS program for the time of day of the requested pick up time and for the streets travelled. On this route, the vehicle could reach a point P1 within, for example, 15 seconds after leaving. A radius R1 is determined by the crow flies distance from the pick-up location PU1 to the point P1 and defines one possible radius of the disk that is centered on the pick-up location PU1. On the other hand, if the vehicle travels south on 1st Ave and turns left on River street, the vehicle will run into a dead end at point P2 within, for example, 9 seconds. The crow flies distance from the pick-up location PU1 to the location P2 defines a second possible radius R2 that is smaller than the radius R1.

In some embodiments of the technology, the radius of the disk is taken to be the smaller of the radius R1 that can be reached by travelling in any direction on the roads within the time limit defined for the disk and the radius R2 to a man-made or obstacle that limits further travel in that direction if reached within the time limit.

Once the radius of the disk has been determined, it is known that the time required to travel between any two locations in the area encompassed by the disk will be less than the time limit defined for the disk (e.g. less than or equal to 30 seconds of travel time The travel time prediction computer system includes a memory where data for each disk are stored. In one embodiment, a disk is associated with an identifier (e.g. a disk number), the address of its seed point, the number of addresses that are covered by the disk (explained below), and the list of the addresses that are covered by the disk. Other information (or less information) about the disks can also be stored if desired.

Once the placement and size of the disks are defined for each of the pick-up and drop-off locations, a processor is programmed to determine a lessor number of disks that will cover each of the addresses in the geographic area in question. In one embodiment, the number of disks is a minimum number of disks required to include all the addresses. However, in some embodiments, the number of disks could be slightly more than a minimum set without significantly affecting performance.

As will be explained below, at least two methods are possible for selecting the number of disks required to include all the pick-up and drop-off locations in the geographic area. Such methods can include a "greedy" method and an "outside in" method. Other methods are also possible.

Once a reduced number of disks is determined to cover all the addresses, a disk-to-disk look up table is created. Again, a GIS program is used to compute a predicted time required for travel between the seed addresses of each disk. Once the travel times between disks have been entered into the look up table, a scheduling program can use the look up table to determine the travel time between any two pick-up and/or drop-off locations by their corresponding disk to disk travel time. The scheduling program first determines the disks in which the starting and ending addresses are located and then reads the travel times between the corresponding disks using the data in the look up table. This is in contrast to using the GIS system to calculate travel times between individual addresses.

Disks and associated look up tables can be defined for different time periods of the day in which the travel speed is fairly constant (e.g. AM and PM rush hours, early morning, late evening etc.) Within a time period, the service area may be partitioned into different speed regions (such as city versus suburbs). The travel speeds may be different for different speed regions and fairly constant within each speed region.

The disk representation may be repeated for each different time period where average travel speeds can vary since the travel speeds determine the sizing of disks. Determining the distance traveled in all directions from the seed address within 15 seconds and limiting the radius of the disk to the shortest distance traveled, accurately sizes disks near speed region boundaries, disallows any obstacle from crossing within any disk, and handles speed region boundaries efficiently and accurately.

Constructing the Candidate Set of Disks to Cover all Unique Addresses in a Time Period of Day As discussed above, the disk representations are dynamically constructed from the unique addresses in a trip request set. Each disk associated with a pick-up or drop-off location represents a geographic distance that can be traveled such that any point to any other point within an area encompassed by the disk takes at most ½ minute of travel time for example. The trips are partitioned by the time period of the requested pick up time. Travel speeds vary by time of day, so the radius of the disk varies to insure intra-disk travel time is at most ½ minute. The time of day can be partitioned into 30 minute periods, 60 minute periods, or arbitrary periods such as morning rush hour between 6:30 and 10:30, afternoon rush hour between 16:00 and 18:30, and so on.

Based on the speed associated with the time period, the unique addresses of the trips whose pick up time falls in that time period are identified, and a corresponding disk is created with the address as a seed point at the center of the disk. The addresses of drop-offs from prior time periods must also be included, if the maximum ride time for that trip makes it possible for the drop-off to occur within this time period. The radius of the disk is calculated using a GIS program such that at the speed of the time period, any point to any other point in the disk takes at most ½ minute. In one embodiment, natural or man-made obstacles that limit the travel distance in any direction reduce the radius of the disk. In addition, traversal into slower speed regions that limit the travel distance in given directions also reduce the radius of the disk.

Method for Calculating the Number of Addresses Each Candidate Disk Covers

Once the disks are defined for each address and the radius of each disk has been determined, a count is made of how many addresses are covered by each disk. In one embodiment the count is determined by calculating a "crow flies" distance between the seed points of the disks. If a seed point is within the radius of a disk, then a count of that disk is incremented by 1.

Assume that there are M unique addresses in a time period T. Each is the seed of a candidate disk. Initialize the "covered count" of unique addresses covered by each candidate disk to 1 (the candidate disk covers its seed unique address).

STEP 1) For unique address 1:
 Sub-step 1a):
 Calculate the "crow flies" distance between unique address 1 and unique address 2. If that distance is within the radius of unique address 1, then unique address 2 falls inside the candidate disk of unique address 1, so increment the "covered count" of unique address 1. If that distance is within the radius of unique address 2, then unique address 1 falls inside the candidate disk of unique address 2, so increment the "covered count" of unique address 2.
 Repeat sub-step 1a) for unique address 3, unique address 4, ..., unique address M.

STEP 2) For unique address 2:
 Sub-step 2a):
 Calculate the "crow flies" distance between unique address 2 and unique address 3. If that distance is within the radius of unique address 2, then unique address 3 falls inside the candidate disk of unique address 2, so increment the "covered count" of unique address 2. If that distance is within the radius of unique address 3, then unique address 2 falls inside the candidate disk of unique address 3, so increment the "covered count" of unique address 3.
 Repeat sub-step 2a) for unique address 4, unique address 5, ..., unique address M.

STEP M-1) For unique address (M-1):
 Sub-step (M-1)a):
 Calculate the "crow flies" distance between unique address M-1 and unique address M. If that distance is within the radius of unique address M-1, then unique address M falls inside the candidate disk of unique address M-1, so increment the "covered count" of unique address M-1. If that distance is within the radius of unique address M, then unique address M-1 falls inside the candidate disk of unique address M, so increment the "covered count" of unique address M.

The results of the crow flies calculations can be placed in a table or other computer readable data structure and used to determine the number of unique addresses that fall within that candidate disk. For example, if Disk_12 has a radius of 0.65 miles and there are 5 other seed points that are within 0.65 miles of the seed point of Disk_12, then the count of Disk_12 is 6 (e.g. 5 seed point addresses of other disks plus the seed point of Disk_12).

Picking the Minimal Covering Set of Disks

Having determined a set of disks that cover each of the addresses, there may be many disks that partially overlap. Not all disks are required to be kept in a look up table that defines the travel time between disks. Therefore, the computer system determines a lessor number of disks that will cover all the addresses.

In one embodiment, the computer system determines a minimal set of disks such that all of the unique addresses fall into at least one of the selected disks. This is a minimal covering set of disks (FIG. 6). In one embodiment, the method to do the selection determines the size of the covering set.

The following describes two different methods to select a minimal covering set. The results of the methods show the improvement of disk-based representation over a grid-based address representation. If there is a significant reduction of number of disks over number of grid sections required to cover all unique addresses, the reduction of the look up table of entity-to-entity travel times will be amplified, with a corresponding faster runtime for the scheduling system. One or more processors execute a series of executable program instructions stored on a non-transitory computer readable medium to identify the minimum set of cover disks. Although the steps of the methods are described in a particular order for ease of explanation, it will be understood that the order may be changed and still achieve the functionality described.

Figure 13A:
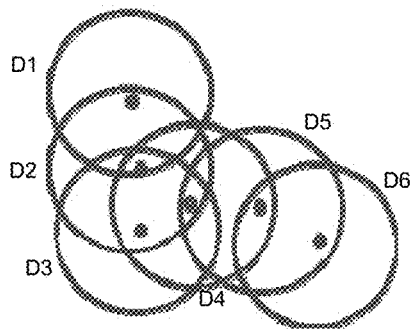

Method 1 is a "greedy" algorithm where one or more processors are programmed to perform the following steps:

Step 1: For all candidate disks, calculate the "covered count" (i.e. the number of unique addresses that fall within that candidate disk) as the figure of merit (FIG. 13a).

Step 2: Set a flag for all the disks as candidates available to be selected (FIG. 13a).

Step 3: Select a disk, DISK-X, that is available, and contains the highest number of uncovered unique addresses (e.g. disk D2 in FIG. 13b).

Figure 13B:
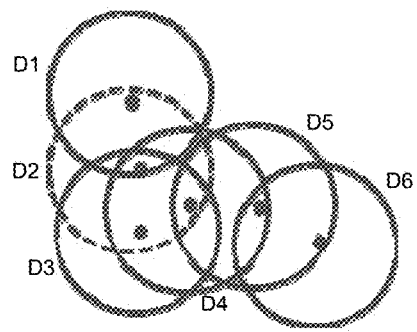
Figure 13I:
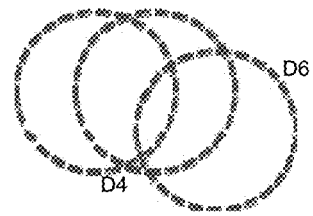

Step 4: Mark DISK-X as unavailable and put DISK-X into the covering set (FIG. 13b).

Step 5: For each of the remaining candidate disks, if the disk contains the seed address of DISK-X, decrement its count of covered addresses, since the seed address is in DISK-X in the covering set. This maintains an accurate figure of merit for each available disk (FIG. 13c).

Step 6: For each unique address A covered by DISK-X (in one embodiment stored in the list of addresses covered by DISK-X), determine if the candidate disk contains the address A. In one embodiment, this can be a crow flies calculation (e.g. Pythagorean Theorem) compared to the radius of the disk. If address A is covered by the candidate disk, decrement the candidate disk's count of covered addresses by 1, since A is in DISK-X in the covering set. This maintains an accurate figure of merit for each available disk (FIG. 13d).

Step 7: For candidate disks whose "covered count"=0, mark as unavailable, since selecting any of these disks adds no value to the covering set (FIG. 13e).

Step 8: Go to Step 3 (FIG. 13a) until there are no more candidate disks and all unique addresses are covered by at least one disk in the covering set.

The second alternative method of selecting the set of covering disks selects a disk that is the farthest away from a defined location among all the addresses (e.g. a center of mass or other defined origin location for the geographic area in question).

Method 2 is an "outward in" algorithm where one or more processors are programmed to perform the following steps:

Step 1: For all candidate disks, calculate the "covered count" (i.e. the number of unique addresses that falls within that candidate disk) as the figure of merit.

Step 2: Determine a centroid of the set of unique addresses (or other defined origin point).

Step 3: Mark all disks with the distance of the disk's seed address from the centroid.

Step 4: Set a flag for all the disks as candidates available to be selected.

Step 5: Select a disk, DISK-X, that is available and farthest away from the centroid.

Step 6: Select the disk, DISK-Y, that covers the seed point of DISK-X and also covers the largest number of unique addresses.

Step 7: Mark DISK-Y as unavailable and put DISK-Y into the covering set.

Step 8: For each candidate disk, if it contains the seed address of DISK-Y, decrement its count of covered addresses, since the seed address is in DISK-Y in the covering set. This maintains an accurate figure of merit for each available disk.

Step 9: For each unique address A that is covered by DISK-Y (e.g. from a list of addresses covered by the disk), for each candidate disk, if the candidate disk contains the address A, decrement its count of covered addresses, since A is in DISK-Y in the covering set. This maintains an accurate figure of merit for each available disk.

Step 10: For candidate disks whose "covered count"=0, mark as unavailable, since selecting any of these adds no value to the covering set.

Step 11: Go to Step 5 until there are no more candidate disks and all unique addresses are covered by at least one disk in the covering set.

Once a reduced set of disks has been determined, a look up table containing the travel times between the seed points of each remaining disk is determined using a GIS or other suitable program. As will be understood by those skilled in the art, the travel times may vary slightly between other addresses encompassed by the area of a disk. However, because the disk only contains locations that can be reached within a preset minimum travel time (e.g. 30 seconds) then the maximum error that can be encountered between addresses in any two disks is 2 times the minimum travel time (e.g. 2×30 seconds or 1 minute), which is accurate enough for route scheduling.

Using the Lookup Table Based on Disks Efficiently

For each time period of day, the computer system is programmed to create a list of disk seed addresses, each with its geocodes, and associated radius.

The lookup table is two-dimensional. In one embodiment, the list of disk seed addresses along the column-dimension represents the "FROM" disk, and the list of disk seed addresses along the row-dimension represents the "TO" disk.

To use the lookup table to find the travel time between two addresses A1 and A2, the computer system must find the disk containing A1 in the column-dimension and find the disk containing A2 in the row-dimension, and look at the travel time in that cell of the lookup table.

In one embodiment, to identify whether an address A0 is contained by a disk, the computer system is programmed to calculate the "crow flies" distance between A0 and the seed address. If that distance is less than or equal to the associated radius, then the answer is "yes". Otherwise, the answer is "no".

One method to find the disk containing A0 is to test A0 against the list of disk seed addresses exhaustively until the containing disk is found. To reduce the set of disks {D0} to test A0 against for containment, one embodiment of the disclosed technology uses the computer system to sort the list of disk seed addresses in ascending order by the "crow flies" distance of the seed address to a Unique Reference Point, such as the Southwest corner of a Service Area. To identify the set of disks that might contain A0 to test against, the computer system first calculates A0's crow flies distance DIST to the Unique Reference Point. Then the computer system looks at the sorted list of disk seed addresses for disks that are within a bounding range of crow flies distances from the Unique Reference Point (e.g. [DIST−0.5 miles, DIST+0.5 miles]). Those disks make up {D0}.

Once the correct disks associated with a pair of address is known, the travel time prediction computer system uses the lookup table to find the predicted travel time between two addresses A1 and A2. In one embodiment, the computer system first finds {D1} along the column-dimension, tests its members to find the "FROM" disk containing A1 finds {D2} along the row-dimension, tests its members to find the "TO" disk containing A2, and looks at the travel time in that sub-table {D1, D2} of the lookup table.

In another embodiment, a record is kept of each address' cover disk as the number of disks is being reduced. The computer then looks to the record to determine the covering disk associated with each address.

Using the Lookup Table to Schedule

Scheduling requires the system to be able to access the predicted travel time between any candidate pair of addresses in the trip set in order to decide if they can correctly and efficiently be made adjacent stops on a route in the schedule.

The conventional calculation of a predicted travel time between two addresses A1 and A2 is complex, making sure to account for going around barriers, crossing rivers on various candidate bridges, considering bridge delays, considering multiple travel paths connecting A1 and A2, applying different speeds for travel path segments in different Speed Regions crossed, and so on. This is obviated by the disk to disk lookup table.

In one possible constructive scheduling algorithm, the repetitive step is to insert unscheduled trips one at a time onto a set of routes. To consider whether one trip T (with 2 stops, Pick and Drop) can fit on one route R containing 20 stops (10 trips) already, the algorithm might test Pick in all 21 possible insertion points—before stop 1, before stop 2, . . . , before stop 20, and after stop 20. For each of those 21 possibilities, the algorithm can test Drop in the positions after Pick. So there are 21+20+19+ . . . +3+2+1=231 possible ways to insert trip T onto route R. In general, for each possible insertion, there is a stop S1 before Pick, a stop S2 after Pick, a stop S3 before Drop, and a stop S4 after Drop. The algorithm must call for 4 travel times—S1 to Pick, Pick to S2, S3 to Drop, and Drop to S4. So to consider whether one trip T can fit on one route R containing 20 stops, it can take up to 231*4=924 calls for travel time. In general, to consider whether one trip T can fit on one route R containing N stops, the number of calls for travel times can be up to ½*(N+2)*(N+1).

Consider inserting up to 25,000 trips one at a time onto up to 2,500 routes. The value of speeding up the calls for travel time by table lookup rather than by calculation becomes clear.

Empirically, for 25,000 trips, the calls for travel times between candidate address pairs by time of day can exceed 200,000,000 times. The number of calls is much smaller than it might be by the clever application of constraints. For example, each stop has a time window in which it must occur. So Pick cannot be inserted into a position between stop S1 and S2 if the Pick window is entirely before the S1 window, or entirely after the S2 window—i.e. Pick must occur after S1, and Pick must occur before S2.

Representational Efficiency Advantage

A disk representation of a geographic area that can be reached in a defined travel time has several advantages over the use of a fixed grid system. First, a disk encompasses 57% more area than a square grid. Secondly, because the disks are dynamically located and sized to the address points, rather than assigning the address points to statically located and sized grid sections, the size of the disks can be adjusted to compensate for differences that affect travel (e.g. manmade or natural barriers, crossing into different speed zones etc.)

As shown in FIG. 5, the area covered by a disk with ½ minute intra-disk travel time is 1.57 times the area covered by the grid section with ½ minute intra-grid section travel time.

Diagonal=Diameter=$X$

Side of GRID=SQRT($X^2/2$)

Area(GRID)=Side$^2$=$X^2/2$

Area(DISK)=$\pi*(X/2)^2$=3.1412*$X^2/4$

Area(DISK)=1.57*Area(GRID)

The pair of points farthest away from each other in a grid is the diagonal from vertex to vertex. Assuming a travel speed of 15 miles per hour, the distance traveled in ½ minute is 0.1250 miles. If this is the diagonal of the grid, the side of the grid is 0.0884 miles. The area of the grid is 0.0078 square miles.

The pair of points farthest away from each other in a disk is the diameter. Assuming a travel speed of 15 miles per hour, the distance traveled in ½ minute is 0.1250 miles. If this is the diameter of the disk, the radius of the disk is 0.0625 miles. The area of the disk is 0.0123 square miles. 0.0123 square miles is 1.57 times 0.0078 square miles. The covering power of the disk is 1.57 times as great as the covering power of the grid.

Representational Efficiency Advantage

Being able to dynamically locate the disks guided by the varying locations of unique addresses has a great advantage over statically locating the grid sections determined by the location of the origin of the Cartesian coordinate system. By picking the minimal covering set of disks, unique addresses that are close to each other will fall into the same dynamically positioned and selected set of disks, but are likely to fall into adjacent fixed-position grid sections (FIG. 10).

Representational Efficiency and Accuracy Advantage

In any time period, for example, from 10:01 to 15:00 between rush hours, there are still variations of travel speed geographically. For example, the travel speed in a suburban neighborhood is different that the travel speed near a university campus.

Figure 3:
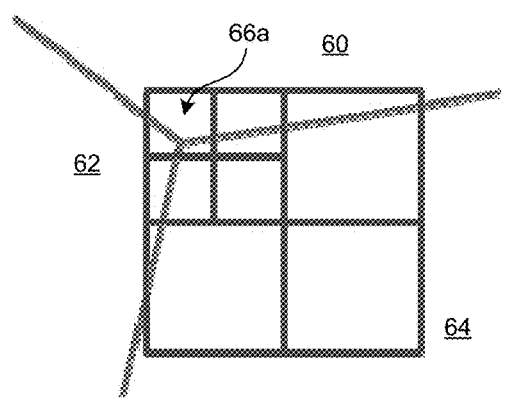
FIG. 3 illustrates a conventional approach to dividing grid sections to accommodate different speed zones.
Figure 4:
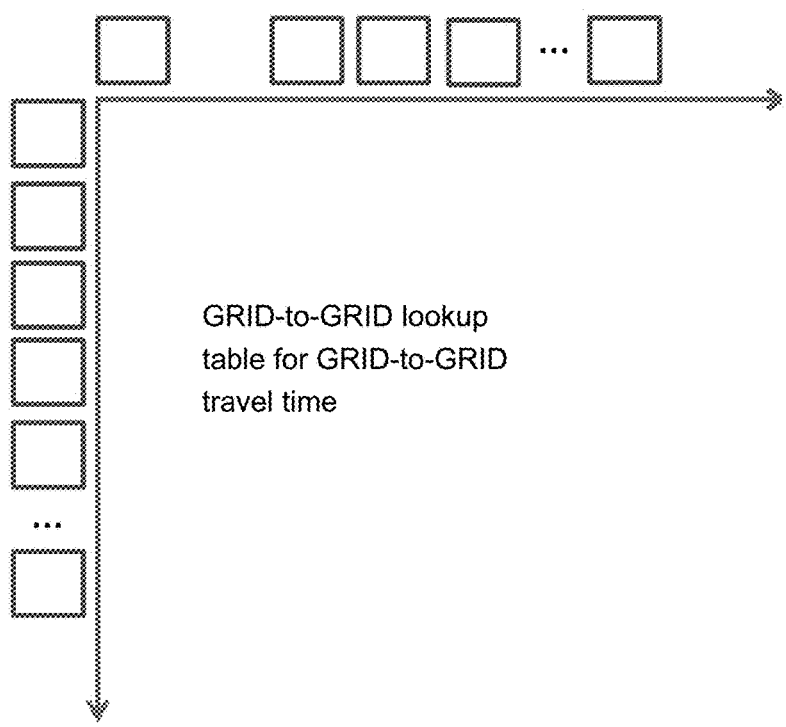
FIG. 4 illustrates a conventional grid-based lookup table to store predicted travel times.

The grid representation is static, and does not easily capture the variations in speed within a time period. The idea of splitting a grid into 4 sub-grid sections as needed is still a fixed partitioning within a static representation. The grid boundaries are unlikely to lie cleanly between speed regions of different speeds (FIG. 3).

Figure 1:
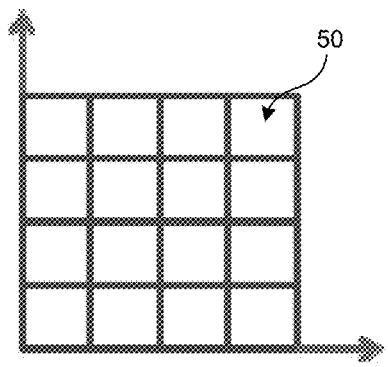
FIG. 1 illustrates a conventional grid section representation of a geographic area in which pick-up and drop-off locations can be located.
Figure 2:
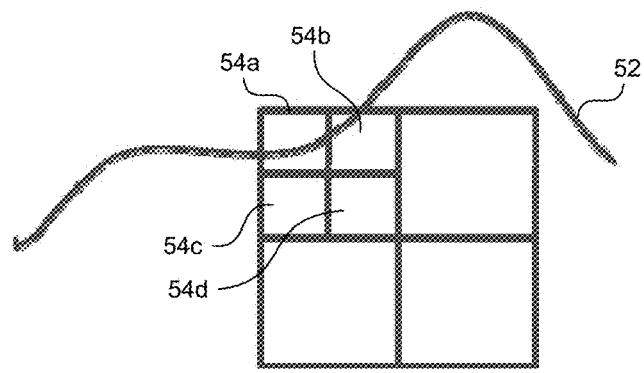
FIG. 2 illustrates a conventional approach of dividing grid sections to accommodate natural or man-made barriers.

The splitting of grid sections to sub-grid sections iteratively as necessary is especially difficult if the parent grid section contains an obstacle such as a river or man-made barrier, since the travel time across the river or barrier at a bridge or gap likely located in a different grid section is no longer ½ minute. The splitting is also problematic in that the original grid section may need to be split many times before each sub-grid section either no longer contains any address or no longer contains any piece of the river (FIG. 2).

One embodiment of the disk representation dynamically generates candidate disks around each unique address as the seed and then selects a reduced or minimal covering set. Any travel time and distance method can be used to calculate the distance traveled from the seed address in all directions in ½ minute. For instance Dijkstra's algorithm or A* to can be used to radiate outward on the street network from the seed, using the speed profiles associated with each street segment. The geographic points in all directions at which the 15 second travel time is reached can be identified. The disk radius is then dynamically determined by the point with the minimum "crow flies" distance to the seed. The integrity of the ½ minute intra-disk travel time is guaranteed by this method of dynamically sizing the disk.

The disks are automatically and dynamically sized as small as necessary to stop at the river's edge or a barrier (FIG. 8).

The disks are automatically and dynamically sized as small as necessary to account for crossing into different Speed Regions as well (FIG. 7).

The sizing of the disks is completely dynamic based on travel speed and geographic features, versus the fixed sizing of (¼)$^n$×grid size, where n is the number of times the grid is split.

Representational Efficiency Advantage

New addresses are often visited in para-transit, and have to be added to the unique address set. If new unique addresses are added to the set, they are more likely to fall into an existing disk than an occupied grid because the disk is 57% bigger. So the number of entities (disks or grids) will be less likely to increase with the disk representation (FIG. 11).

Computational Speedup Advantage—One Production Test Data Set

In one actual test, the covering power of disk representation compared to the covering power of the grid representation was determined from 2 production data sets from 2 different para-transit sites. The first data set contains 24,536 trips from a major city in the Northeastern U.S. The second data set contains 3,226 trips from a different major city in the Northeastern U.S. The following are statistics from the larger data set with 24,536 trips.

In the test, the time period was set to be 10:01 to 15:00 that identified 11,035 trips with pick times in that time period. These trips are represented by 11,647 unique addresses. The drop addresses of trips that have pick times in earlier time periods might fall into this time period. For the purpose of this test, they were not included.

For the test, a travel speed of 15 miles per hour was assumed in that time period, and a target intra-grid travel time of ½ minute was selected.

The grid representation is static. But the number of occupied grids might be sensitive to the offset or origin of the grid system. So in the test, the offset was varied by 0.0200 miles to test that sensitivity (the grid size is 0.0884 miles). For the 4 different offsets, the number of occupied grids was:

Offset Occupied Grids
Offset 1 8009 grids
Offset 2 8024 grids
Offset 3 7979 grids
Offset 4 8031 grids There seems to be little sensitivity to the location of the origin of the grid system. The smallest number of occupied grids is 0.65% smaller than the largest number of occupied grids.

For the same trip set and time period, travel speed, and intra-disk travel time, both the "greedy" algorithm and the "outside in" algorithm were implemented.

Method Covering Set of Disks
"Greedy" 6777 disks
"Outside in" 6772 disks

The "outside in" algorithm identified 6772 disks that covered all unique addresses. Compared to Offset 3 that needed 7979 grids to cover all unique addresses, this is 1207 (15.13%) fewer entities.

For ½ minute intra-entity travel time at 15 mph, reducing the entities needed to cover the unique addresses by 15.13% is amplified by the use of those entities to build an N×N lookup table (FIG. 12). To cover the travel time prediction of 11,647 unique addresses with 7979 grids, the lookup table would be 7979×7979=63,664,441 entries (assuming bi-directional travel speeds). To cover the travel time prediction of 11,647 unique addresses with 6772 disks, the lookup table would be 6772×6772=45,859,984 entries (assuming bi-directionality of travel).

For a reduction of 1207 (15.13%) in entities, there is a reduction of 17,804,457 lookup table entries (27.97%).

This has a corresponding speedup in computation, since travel time prediction is the overwhelming majority of the scheduling system's processing workload.

The result of the execution is a look up table that stores a representation of trip times between any two disks that contain addresses in an address set. The trip determination times can be used by a scheduling program to determine how routes should be selected to each requesting address.

Figure 14:
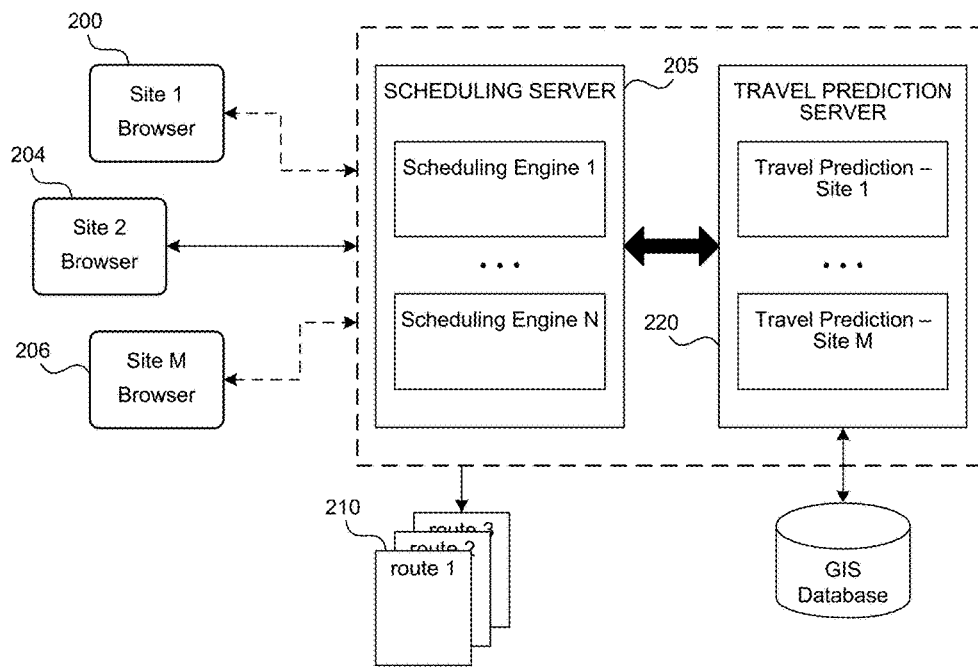
FIG. 14 illustrates an architecture of an internet-based scheduling service in accordance with an embodiment of the disclosed technology.

In one embodiment, an accurate and faster travel time prediction service directly leverages the economic value of Scheduling as a Service. In an embodiment shown in FIG. 14, a server 200 is accessible from one or more remote locations using, for example, computers, smart phones, tablets or the like running computer communication programs such as an Internet browser program over a wired or wireless communication link. In one embodiment, the computer 200 is operated by a city or municipality that collects requested pick-up and drop-off locations from its customers. A requested list of all the pick-up and drop off locations are compiled and sent from the computer 200 to a scheduling server 205 to determine one or more routes 210 that will meet the requirements of the rides requested. The server 205 forwards the list of requested pick-up and drop-off locations to a travel time prediction server 220 that determines predicted travel times between the addresses using the methods described above. The travel time prediction server 220 may interact with a GIS program 230 that can calculate a predicted travel time between any two locations using a street map and travel speed knowledge for the area in question. In one embodiment, the travel time prediction server 220 stores predicted travel times between a number of disks that encompass the requested pick-up and drop-off locations in a look up table as manner described above. Once the predicted travel times have been determined by the travel time prediction server 220, the scheduling server 205 can request a predicted travel time between any two pick-up or drop-off locations and use the predicted travel time to produce one or more routes 210.

In another embodiment, individual users may request rides using their own computer, tablet, smartphone etc. The addresses of the requested pick-up and drop-off locations are received by the scheduling server 205 and combined with other ride requests before beginning the process of determining one or more routes that will meet the ride request demands. The scheduling server 205 then produces one or more routes 210 that are given to the drivers of a fleet of vehicles and messages are transmitted to the ride requesters confirming that their ride has been scheduled. The details of how the individual routes are created once the predicted travel times between one or more pick-up and drop-off locations have been determined are considered to be known to persons skilled in the art of ride scheduling. However, the operating speed of the scheduling server 205 is faster because the time required to determine the predicted travel times is less and the travel times are more accurate due to how the travel times are stored in a look up table or other computer readable data structure. The resulting routes 210 are therefore made by using the predicted travel times that are stored by the travel time prediction server 220.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A system for storing travel times between addresses in a geographic region, comprising:
   a non-transitory computer readable medium having instructions stored thereon that are executable by a processor;
   a memory that is configured to store descriptions of geographic areas for which a travel time between any locations included in a description of a geographic area is less than or equal to a predetermined time limit;
   one or more processors that are configured to execute the instructions in order to:
      receive a list of addresses between which travel times from one address to another address are desired;
      for each address of the list of addresses, determine a geographic area having a boundary that can be reached by travel from the address in any direction within the pre-determined time limit;
   reduce a number of geographic areas determined for the addresses in the list of addresses so that some geographic areas encompass two or more addresses in the list of addresses and every address in the list of addresses is encompassed by at least one geographic area; and
   store a predicted time to travel between the geographic areas that encompass the addresses in the list of addresses in the memory that can be accessed by a scheduling program to plan routes that include the addresses in the list of addresses.

2. The system of claim 1, wherein each geographic area is stored in the memory as a description of a disk having an address in the list of addresses at a center point and a radius equal to a minimum distance that can be travelled over streets leading from the center point in the predetermined time limit.

3. The system of claim 2, wherein the memory is configured to store a radius of each disk that is equal to a minimum distance that can be travelled over streets leading from an address in the list of addresses at the center point of the disk to a man-made or natural obstacle within the predetermined time limit.

4. The system of claim 1, wherein the predicted travel times between addresses encompassed by different geographic areas are stored as a lookup table in the memory.

5. A system for storing predicted travel times between addresses in a geographic region, comprising:
- a computer readable memory having stored instructions that are executable by a processor;
- one or more processors that are configured to execute the instructions in order to:
  - receive a list of addresses for a number of pick-up and drop-off locations to be scheduled into one or more routes;
  - for each address in the list of addresses, define a disk encompassing a geographic area that includes the address in the list of addresses at a center of the disk, wherein the disk has a radius selected that is the smaller of:
    - a minimum distance that can be travelled over streets leading in any direction from the address in the list of addresses at the center of the disk within a predetermined time limit; or
    - a minimum distance that can be travelled over streets leading from the address in the list of addresses at the center of the disk to a man-made or a natural obstacle within the predetermined time limit;
  - reduce a number of disks so that at least two addresses in the list of addresses are encompassed by a single disk and that every address in the list of addresses is encompassed in the area of at least one disk; and
- a memory that is configured to store descriptions of the disks that encompass the list of addresses received and to store predicted travel times between addresses encompassed by the geographic areas of different disks.

6. A non-transitory computer readable medium having instructions stored thereon that are executable by a processor to:
- receive a list of addresses for pick-up and drop-off locations to be scheduled into one or more routes;
- for each address in the list of addresses, define a disk encompassing a geographic area that includes the address in the list of addresses at a center of the disk, wherein the disk has a radius selected to be the smaller of:
  - a minimum distance that can be travelled over streets leading in any direction from the address at the center of the disk in a predetermined time limit; or
  - a minimum distance that can be travelled over streets leading from the address at the center of the disk to a man-made or a natural obstacle that limits further travel within the predetermined time limit;
- reduce a number of disks so that at least two addresses in the list of addresses are encompassed by a single disk and that every address in the list of addresses is encompassed in the area of at least one disk; and
- store descriptions of the disks and predicted travel times between addresses encompassed by the geographic areas of different disks in a memory.

* * * * *